（12）United States Patent
Reubeuze et al.

(10) Patent No.: US 7,828,386 B2
(45) Date of Patent: Nov. 9, 2010

(54) MOTOR VEHICLE SEAT TILT ADJUSTMENT MECHANISM

(75) Inventors: Yann Reubeuze, Landigou (FR); Francois Baloche, La Carneille (FR)

(73) Assignee: Faurecia Sièges d'Automobile, Nanterre (FR)

( * ) Notice: Subject to any disclaimer, the term of this patent is extended or adjusted under 35 U.S.C. 154(b) by 203 days.

(21) Appl. No.: 12/207,030

(22) Filed: Sep. 9, 2008

(65) Prior Publication Data

US 2009/0066138 A1 Mar. 12, 2009

(30) Foreign Application Priority Data

Sep. 12, 2007 (FR) ................................. 07 06389

(51) Int. Cl.
*B60N 2/235* (2006.01)
(52) U.S. Cl. ................................. 297/367 P
(58) Field of Classification Search ............ 297/367 R, 297/367 P, 378.12
See application file for complete search history.

(56) References Cited

U.S. PATENT DOCUMENTS

| | | | |
|---|---|---|---|
| 5,590,931 A * | 1/1997 | Fourrey et al. ............. | 297/366 |
| 5,769,494 A | 6/1998 | Barrere et al. | |
| 5,857,746 A | 1/1999 | Barrere et al. | |
| 6,007,153 A * | 12/1999 | Benoit et al. ............ | 297/378.12 |
| 6,112,370 A * | 9/2000 | Blanchard et al. ......... | 297/378.12 |
| 6,244,661 B1 | 6/2001 | Timon et al. | |
| 6,676,217 B2 | 1/2004 | Lange | |
| 7,165,813 B2 * | 1/2007 | Tame ...................... | 297/367 R |
| 7,475,945 B2 * | 1/2009 | Reubeuze et al. ........ | 297/367 R |
| 2003/0025376 A1 * | 2/2003 | Moriyama et al. ........... | 297/367 |
| 2006/0022503 A1 | 2/2006 | Reubeuze et al. | |
| 2006/0226687 A1 | 10/2006 | Leconte | |

FOREIGN PATENT DOCUMENTS

| | | |
|---|---|---|
| DE | 19730646 | 1/1999 |
| DE | 19916361 | 10/1999 |
| DE | 10051346 A1 | 10/2000 |
| FR | 2739812 | 4/1997 |
| FR | 2873633 | 2/2006 |

OTHER PUBLICATIONS

Office Action issued by German Patent Offfice in parallel German Patent Application No. 10-2008 046 275.6-14; Report dated Mar. 9, 2010.
French Search Report and Written Opinion; Report dated Apr. 25, 2008.

* cited by examiner

*Primary Examiner*—Peter R. Brown
(74) *Attorney, Agent, or Firm*—Miller, Matthias & Hull

(57) ABSTRACT

The mechanism comprises first and second slugs, comprising a first contact shoe engaging with a first locking bearing surface, and a second contact shoe engaging with a second, parallel locking bearing surface. The first contact shoes of the first and second slugs extend circumferentially about the tilt axis and each has first and second complementary radial guide surfaces parallel to the tilt axis to guide the movement of the first slug between its locking and release positions.

8 Claims, 8 Drawing Sheets

MOTOR VEHICLE SEAT TILT ADJUSTMENT MECHANISM

CROSS-REFERENCE TO RELATED APPLICATIONS

This application claims priority under the Paris Convention to French Patent Application No. 07 06389, filed on Sep. 12, 2007.

FIELD OF THE DISCLOSURE

The present invention relates to motor vehicle seat tilt adjustment mechanisms.

BACKGROUND OF THE DISCLOSURE

More particularly, the invention relates to a motor vehicle seat tilt adjustment mechanism comprising:
  a first cheek plate designed to be fixed to a first seat element,
  a second cheek plate designed to be fixed to a second seat element, and rotatably mounted relative to the first cheek plate about a tilt axis, and
  a locking system comprising:
    a first locking bearing surface on the first cheek plate,
    a second locking bearing surface on the second cheek plate, in a plane parallel to the first bearing surface, and
    at least a first slug and a second slug, each having a first contact shoe adapted to engage with the first bearing surface, and a second contact shoe adapted to engage with the second bearing surface, the slugs being moveable from a locking position in which they engage with the two bearing surfaces to prevent a relative rotation of said cheek plates, to at least one release position in which they no longer engage with at least one of the two bearing surfaces in order to allow a relative rotation of said cheek plates.

Document FR 2 873 633 describes an example of such a mechanism that is perfectly satisfactory because it offers a high breaking strength. Nonetheless, it would be desirable to reduce further the clearance between the various components of the mechanism.

SUMMARY OF THE DISCLOSURE

To this end, according to the invention, a mechanism of the kind in question is characterized in that the first contact shoes of at least the first and second slugs extend circumferentially about the tilt axis, each having a first radial guide surface and a second radial guide surface, both parallel to the tilt axis, the first and second guide surfaces being complementary, and the first guide surface of the first slug being adapted to engage with the second guide surface of the second slug throughout the entire movement of the first slug between its locking and release positions.

By means of these arrangements, the possible movement of the slug in the circumferential direction is limited.

Preferred embodiments of the invention may optionally also make use of any of the following arrangements:
  the first slug has a rotational movement between its locking and release positions, and the first guide surface comprises a curved sector, and the second guide surface comprises a protrusion which slides in the curved sector during said movement of the first slug;
  the first guide surface of the first slug is adapted to engage with the second guide surface of the second slug also during the movement of the second slug between its locking position and its at least one release position;
  each slug has a bent intermediate region between the first and second contact shoes;
  the first contact shoe is formed by a thin plate of a first thickness; the second contact shoe is formed by a thin plate of a second thickness; and the slug has a thick intermediate region between the first and second shoes, the thickness of which is equal to or greater than the sum of the first and second thicknesses;
  the mechanism comprises a first operating member designed to be moved by a user to move the slugs into a first release position, the first operating member comprising a first stop surface, the first contact shoe of the first slug being formed by a thin plate having approximately parallel first and second main walls, the edge of the thin plate comprising one of the first and second guide surfaces of the first slug, and first and second blocking surfaces radially spaced apart from each other, the first stop surface of the first operating member contacting the first blocking surface, the second blocking surface engaging with the first locking bearing surface, and the first main wall resting on a main wall of a contact shoe of another slug in the locking position of said first slug;
  the first bearing surface occupies 360°, and the second bearing surface comprises a plurality of separate locking sectors angularly spaced apart from each other;
  the mechanism comprises a first operating member operable by a user to move the slugs from their locking position to a first release position, in which position the first bearing surface is free to rotate relative to a system consisting of the second cheek plate and the slugs about the tilt axis, and comprises a second operating member operable by a user independently of the first operating member, to move the slugs from their locking position to a second release position, in which position the second bearing surface is free to rotate relative to a system consisting of the first cheek plate and the slugs about the tilt axis.

Other features and advantages of the invention will become apparent in the course of the following description of two embodiments thereof. The description is given by way of non-restrictive example referring to the appended drawings.

BRIEF DESCRIPTION OF THE DRAWINGS

In the drawings.

In the various figures, identical references denote identical or similar elements.

DETAILED DESCRIPTION OF THE DISCLOSURE

Figure 1:
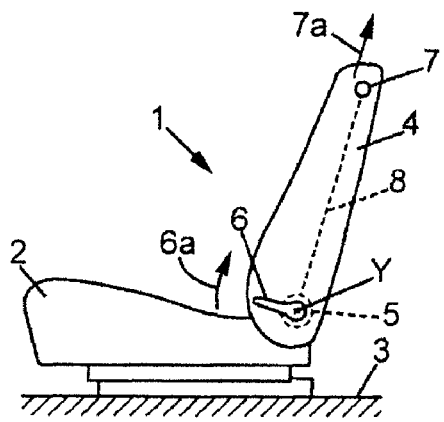
FIG. 1 is a schematic view of a seat whose backrest is adjustable for tilt by means of at least one hinge mechanism in one embodiment of the invention.

As shown schematically in FIG. 1, the invention relates to a vehicle seat 1 that comprises on the one hand a squab 2 mounted on the floor 3 of the vehicle, and on the other hand a backrest 4 which pivots on the squab 2 about a transverse horizontal axis Y, by means of at least one adjustment mechanism 5.

The adjustment mechanism 5 can be controlled for example by means of a handle 6 which can be turned in direction 6$a$ to release the backrest 4 and allow it to pivot about the axis Y.

The backrest 4 may also comprise a supplementary control member 7—a handle or the like—which may be located for example at the top of the backrest 4 and which is connected to the hinge mechanism by a cable 8 such as a sheathed cable 8.

Figure 2:
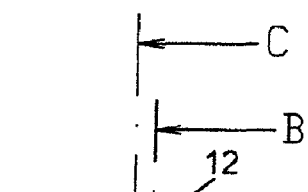
FIG. 2 is a detail view showing the hinge mechanism allowing angular adjustment of the backrest of the same seat as in FIG. 1.

As shown in FIG. 2, one end of the core 8$a$ of the sheathed cable 8 may be fixed for example to a lever 9 connected to the handle 6, the sheath 8$b$ of the cable also being attached to the backrest frame. The lever 9 may for example be positioned so that operating the handle 7 pulls the core 8$a$ of the cable 8 and moves said lever 9 of the handle 6 in the opposite angular direction 9$a$ to the abovementioned direction 6$a$.

Figure 3:
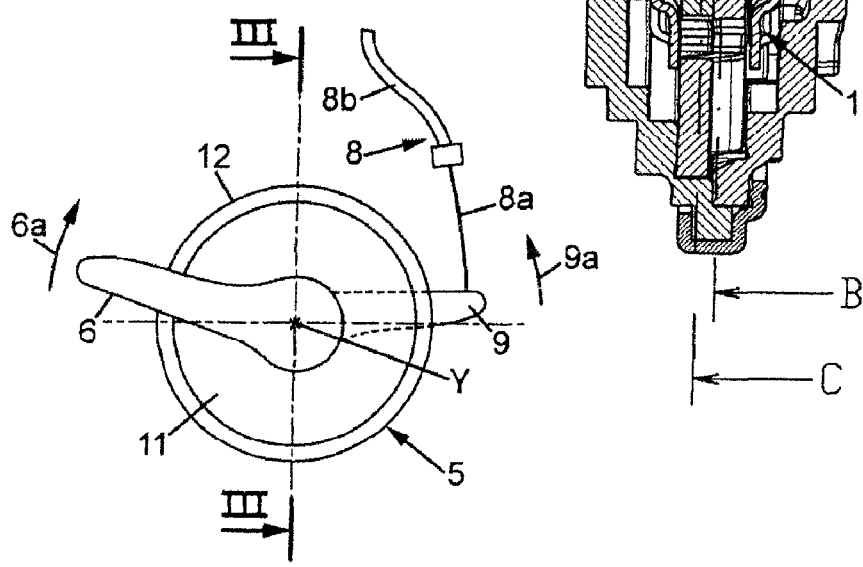
FIG. 3 is a cross section on III-III as marked in FIG. 2 for a first embodiment.
Figure 4:
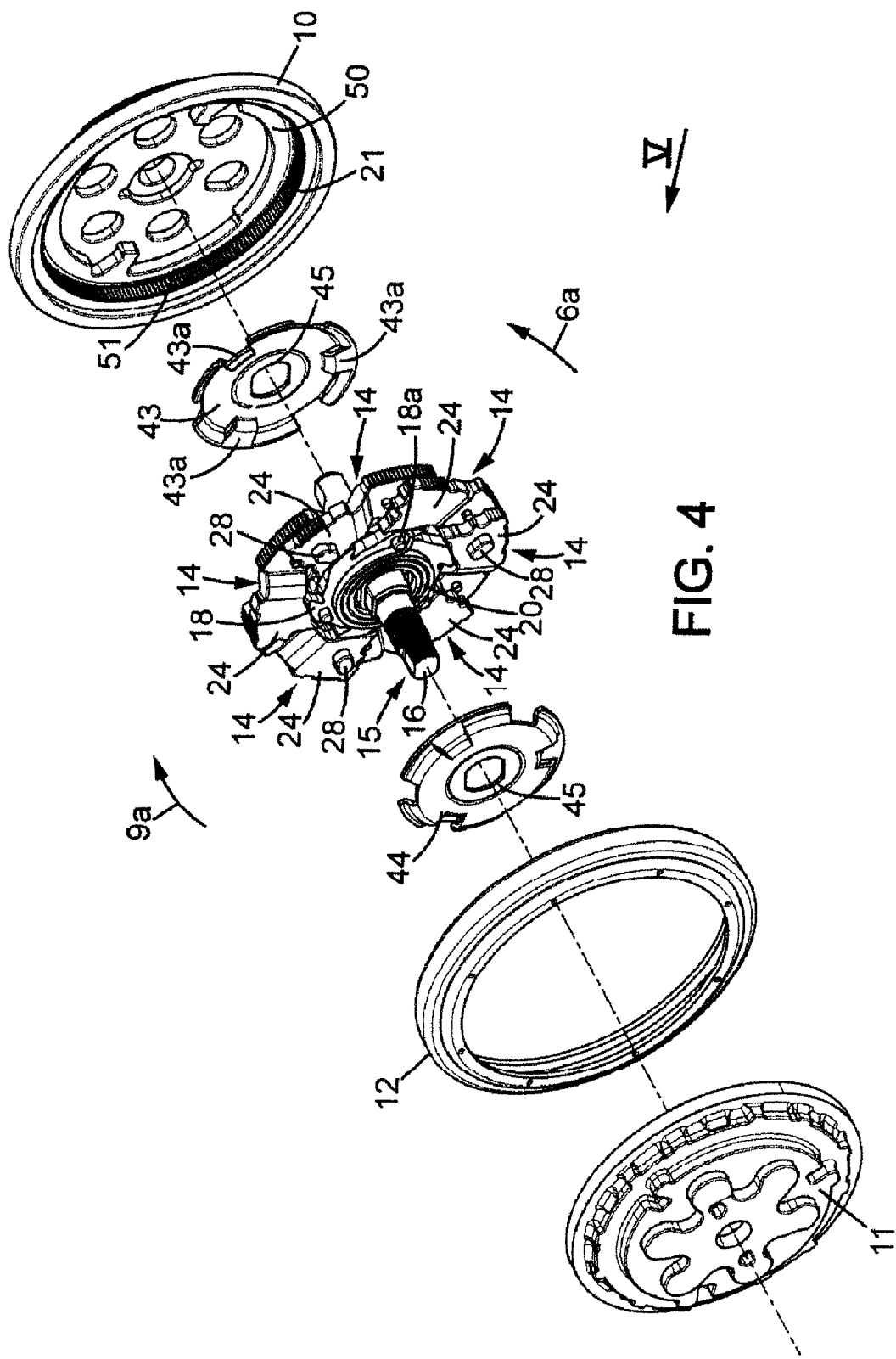
FIG. 4 is an exploded view of the same hinge mechanism as in FIG. 3.
Figure 5:
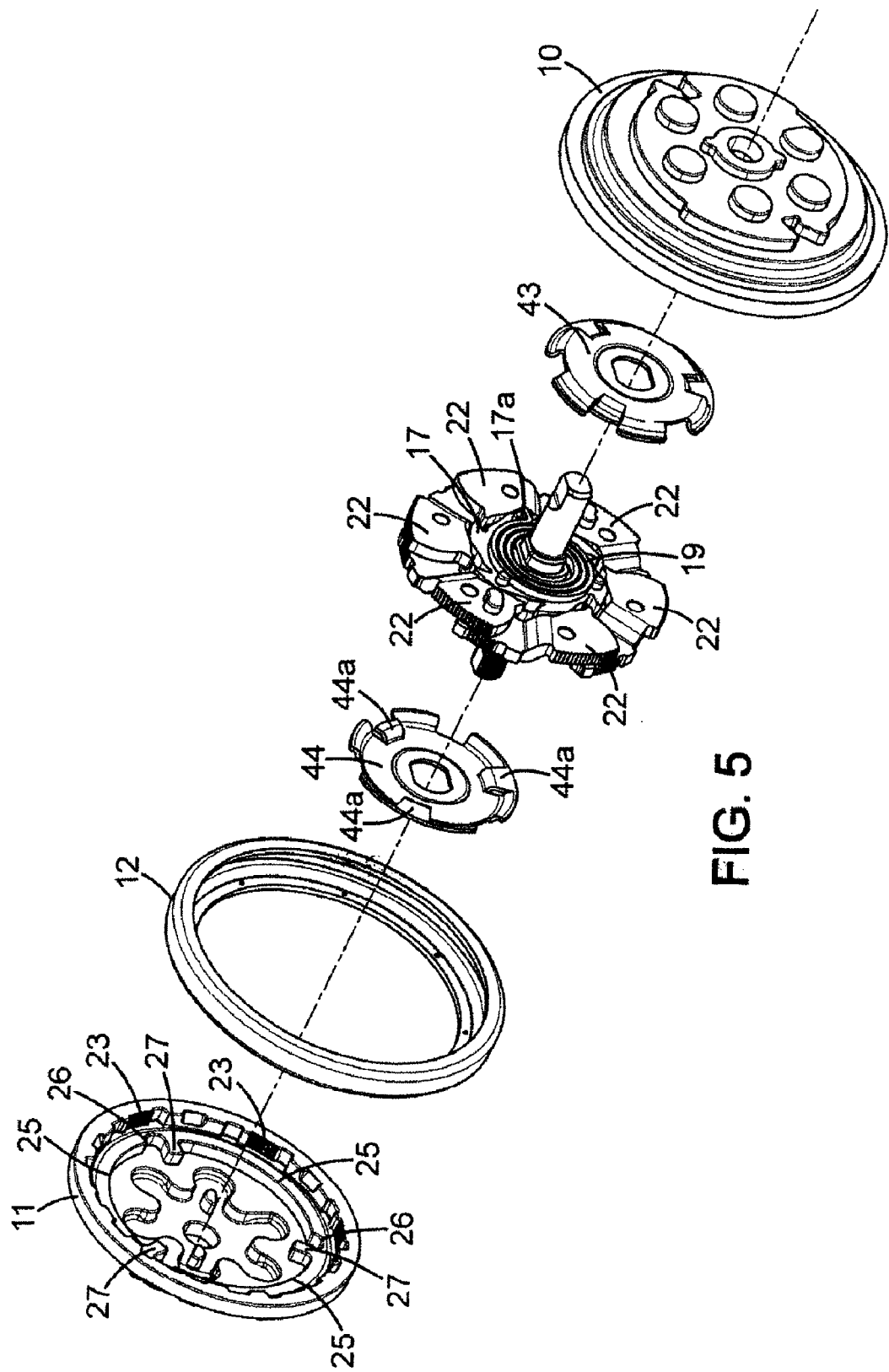
FIG. 5 is a view similar to FIG. 4 but viewed in direction V as marked in FIG. 4.

As shown in FIGS. 3-5, the adjustment mechanism 5 may comprise for example:

- a first rigid connecting member 10, such as a metal cheek plate in the general shape of a disk concentric with the axis of rotation Y, this first connecting member being fixed for example to the frame of the backrest 4 (or if preferred to the frame of the squab 2),
- a second rigid connecting member 11, such as a metal cheek plate in the general shape of a disk concentric with the Y axis, this second connecting member being fixed for example to the frame of the squab 2 (or if preferred to the frame of the backrest 4),
- a metal ring 12 crimped onto the perimeter of the first and second connecting members 10, 11 and allowing relative pivoting between these two connecting members about the Y axis (the crimped ring 12 could however be replaced by any other means cheek plateable of holding the two connecting members 10, 11 together while leaving them free to rotate about the Y axis),
- and a locking system 13 for selectively locking and releasing the two connecting members 10, 11 to prevent or allow their relative rotation about the Y axis.

As shown in more detail in FIGS. 4-7, the locking system 13 comprises at least one rigid slug 14 in the general shape of an arc of a circle. There may be for example six slugs 14 distributed at angles of 60° from each other about the Y axis, in the example considered here.

The slugs 14 are controlled by a control device 15 (see also FIGS. 8 and 9) which, in the example illustrated, comprises:

- a rigid central shaft 16 fixed to the handle 6 and to the lever 9,
- first and second plates 43, 44 which may for example be pieces of flat sheet metal, the first extending in a first plane and the second in a second distinct plane, these planes being both perpendicular to the axis of rotation Y, and the plates being both fixed to the shaft 16, and
- first and second cams 17, 18 which may for example be pieces of superimposed flat sheet metal extending between the first and second plates, the first in a third plane and the second in a fourth distinct plane, these planes being both perpendicular to the axis of rotation Y, the first cam 17 being urged elastically in the second angular direction 9$a$ and the second cam 18 in the first angular direction 6$a$.

The elastic urging of said cams 17, 18 may be provided for example by first and second springs 19, 20 which may for example be spiral springs of approximately equal stiffness, where the inner end is connected to the shaft 16 and the outer end bears for example on a projecting pin 17$a$, 18$a$ projecting from the corresponding cam. The inner end of the springs 19, 20 can be fixed to the shaft 16 by for example giving the shaft 16 a shape other than a cylinder of revolution and forming the radially inner part of the springs 19, 20 to it so that this inner part fits around the perimeter of the shaft 16.

The plates 43 rotate about the Y axis with the shaft 16, for example by being engaged through a central opening 45 that does not have symmetry of revolution and is complementary to the shape of the shaft 16.

The plates 43, 44 also each have three operating portions 43$a$, 44$a$, respectively, arranged at angles of 120° about the Y axis.

In the example shown in the drawings, the first connecting member 10 comprises a first locking bearing surface 21 which is circular and faces radially inwards (in the example under consideration, the locking bearing surface 21 forms a complete circle, but said locking bearing surface could simply be one or more arcs of a circle centered on the axis of rotation Y).

Said first locking bearing surface 21 is situated in the plane of the first cam 17, and each of the slugs 14 comprises a first locking contact shoe 22, situated in the same plane, which is designed to engage with the locking bearing surface 21 and so immobilize said slugs 14 relative to the first connecting member 10.

In the example under consideration, the first locking bearing surface 21 is a series of teeth projecting radially inwards and the locking contact shoes 22 of the slugs take the form of teeth projecting radially outwards. If desired, the first locking bearing surface and the first locking contact shoes could also be non-toothed surfaces interacting by friction.

In addition, as shown in FIG. 5, the second connecting member 11 has at least a second locking bearing surface 23, in the present case six locking bearing surfaces 23 arranged at angles of 60° from each other in the example under consideration. Said second locking bearing surfaces 23 are of circular form (more particularly arcs of a circle) centered on the Y axis, optionally of the same diameter as the first locking bearing surface 21.

The second locking bearing surfaces 23 face radially inwards, in the plane of the second cam 18. They are therefore immediately adjacent to the first locking bearing surface 22, in the direction of the Y axis.

The slugs 14 each comprise a second locking contact shoe 24 which is also situated in the plane of the second cam 18 and is designed to engage with one of the second locking bearing surfaces 23 of the second connecting member 11. The second locking contact shoe is offset angularly with respect to the first locking contact shoe 22 and is so arranged that there is no axial overlap between the two locking contact shoes 22, 24.

In the example under consideration, the second locking bearing surfaces 23 and the second locking contact shoes 24 consist of teeth projecting radially inwards and radially outwards, respectively, but they could optionally also be surfaces interacting by friction.

As can be seen in FIG. 5, the second connecting member 11 also has circular guide surfaces 25 centered on the Y axis and facing radially inwards. Each of these guide surfaces 25 extends angularly, in the angular direction 6a, between a radially inwardly projecting stop 27 and a radially outwardly extending notch 26, said notch 26 being adjacent to another stop 27 (in the example under consideration there are three notches 26 and three stops 27).

The guide surfaces 25, the notches 26 and the stops 27 interact with the slugs 14, for example with projecting pins 28 carried to three of the slugs 14 on the locking contact shoe 24. Slugs with pins 28 and slugs without alternate with each other. The pins 28 in question are normally engaged in the abovementioned notches 26 to allow the second locking contact shoes 24 of the slugs to engage with the second locking bearing surfaces 23 of the second connecting member.

Figure 6:
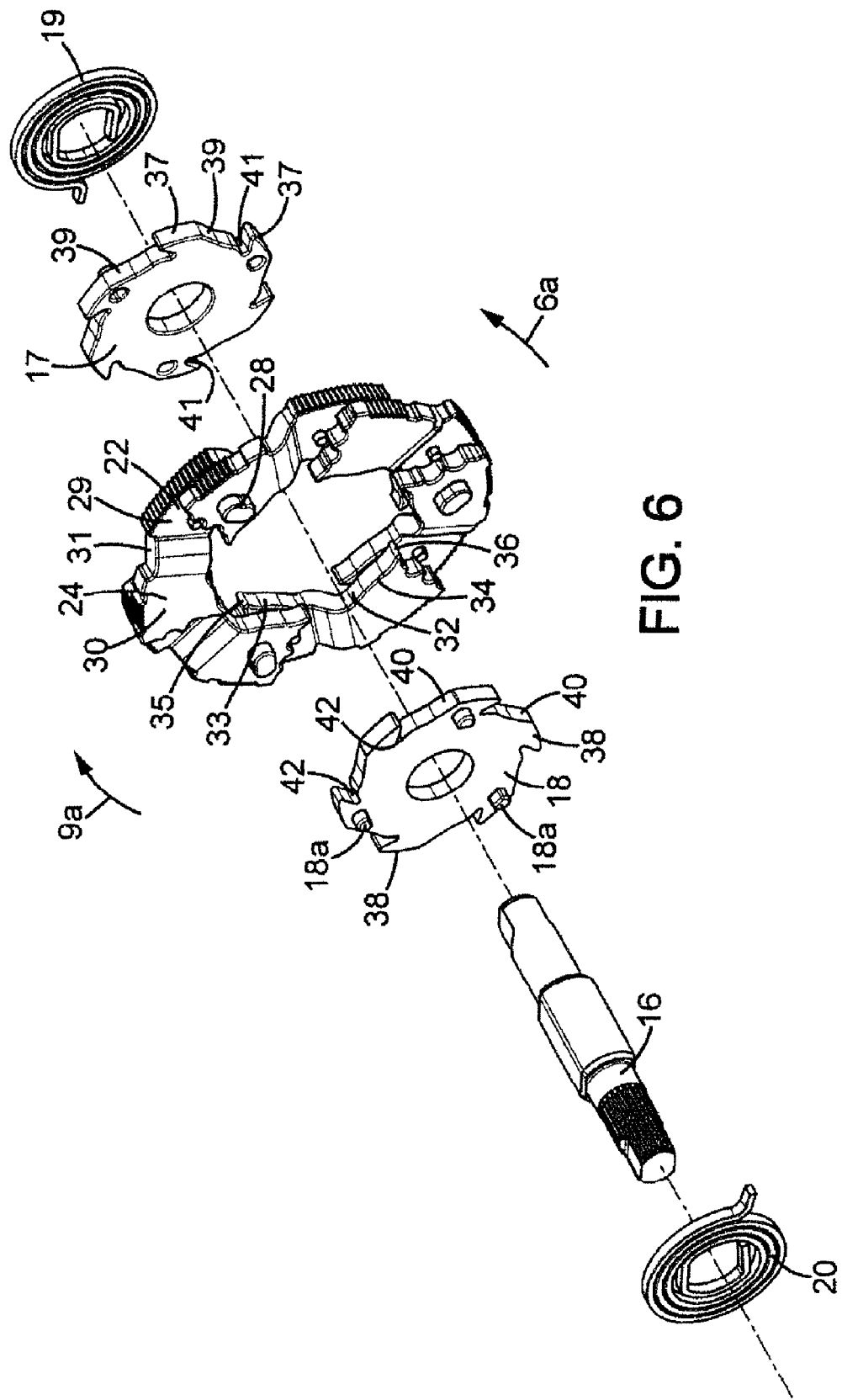
FIG. 6 is an exploded view showing the detail of the locking system of the hinge mechanism of FIG. 4, viewed in the same direction as FIG. 4.
Figure 7:
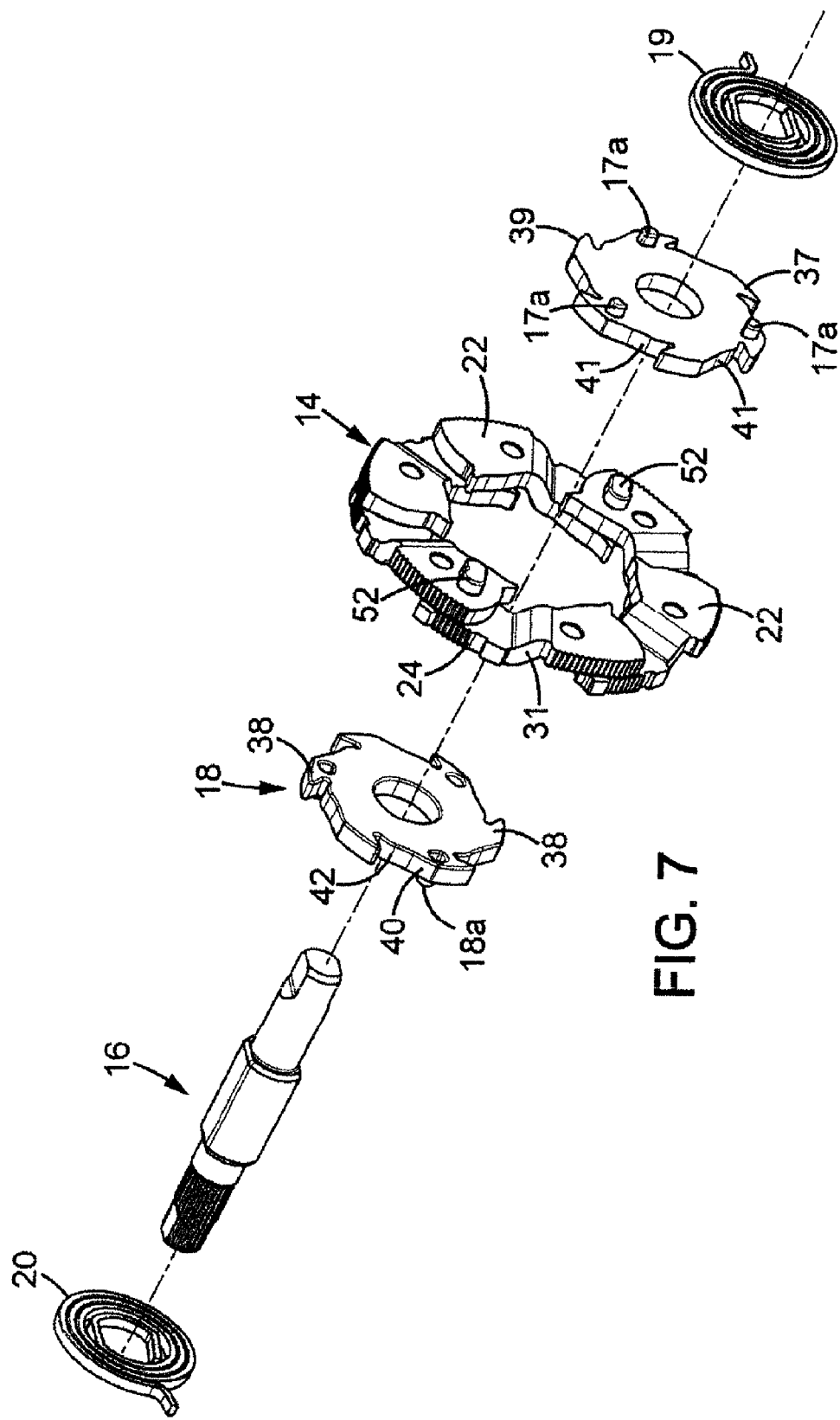
FIG. 7 is a view similar to FIG. 6, viewed in the same direction as FIG. 5, FIGS. 8 and 9 are cross-sectional views of the same hinge mechanism as in FIG. 3, on lines C-C and B-B, respectively, as marked in FIG. 3, with the adjustment mechanism locked.
Figure 12:
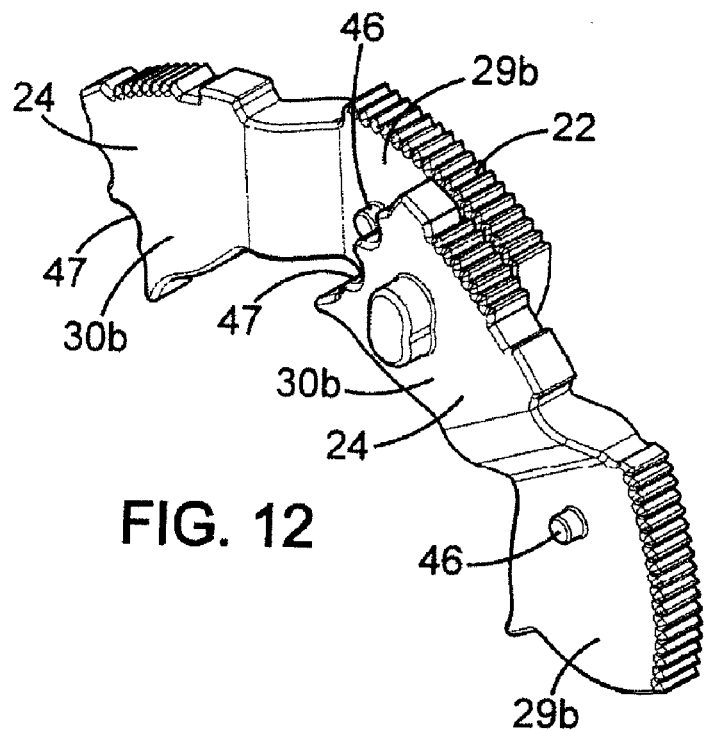
FIG. 12 is a perspective view of two adjacent slugs in accordance with the first embodiment.

As FIGS. 6 and 7 show, each slug 14 may if necessary take the form of a cut and bent metal plate comprising first and second flat parts 29, 30 located in the planes of the first and second cams 17, 18, respectively, and bearing the first and second locking contact shoes 22, 24, respectively, and the second flat part 30 also bears the abovementioned pin 28. Each flat part has two main walls 29a, 29b, 30a, 30b on opposite sides in the direction of the Y axis, and a peripheral edge (see FIG. 12). The first and second flat parts 29, 30 of each slug are also joined by a bowed region 31. Since the slugs 14 comprise two flat parts 29, 30 in two separate planes, the first and second flat parts 29, 30 of two adjacent slugs at least partly superimpose. Each first contact shoe 22 has a guide pin 46 extending axially parallel to the Y axis and engaging with a complementary guide surface 47 in the second contact shoe 24 of an adjacent slug. The guide surface 47 is shaped roughly like a W, the guide pin 46 coming alongside the central core of the W when the adjustment mechanism is in the rest position. Extending either side of this central core are two curved guide portions.

Each slug 14 may also have, on its radially inner edge, a central recess 32 between two bearing surfaces 33, 34, the latter belonging to the flat parts 29, 30, respectively. The bearing surfaces 33, 34 in turn lie between two release fingers 35, 36 extending obliquely radially inwards and at opposite angles to each other.

The outer edges of the first and second cams 17, 18 are moreover identical or similar to each other, but of opposite angular orientations. More specifically, the first cam 17 comprises a series of hooks 37 extending obliquely radially outwards and angularly in the direction 6a. The hooks may for example be six in number and arranged at angles of 60° from each other about the Y axis. The second cam 18 has hooks 38 similar to the abovementioned hooks 37 but pointing in the angular direction 9a.

Each hook 37 of the first cam is moreover associated to a cam surface 39 that comes immediately behind said hook in the angular direction 6a. Between each hook 37 and the cam surface 39 that follows it in the angular direction 6a is a recess 41 that extends radially into the cam 17.

The second cam 18 also has cam surfaces 40 and recesses 42, each cam surface 40 being immediately behind a hook 38 in the angular direction 9a and being separated from the preceding hook 38 (still in the angular direction 9a) by a recess 42.

The cam surfaces 39, 40 are designed to bear against the bearing surfaces 33, 34, respectively, of the slugs so that the first and second locking contact shoes 22, 24 of these slugs engage with the first and second locking bearing surfaces 21, 23, respectively, when the adjustment mechanism is in the rest position.

The cam hooks 37, 38 engage in the slug recesses 32, and the slug release fingers 35, 36 in the recesses 41, 42, respectively, of the two cams.

Three of the six hooks 37 of the cam 17 are provided with a pin 17a, one of which is also, as explained earlier, connected to one end of the spring 19. Hooks 37 with pins 17a, and hooks 37 without pins alternate around the circumference. In the rest position the first plate 43 is positioned in such a way that its actuating portions 43a are situated radially in contact with a single pin 17a each.

The second plate is similarly positioned relative to the cam 18, so that the two plates 43 and 44 create a lost-motion connection with the two cams.

The locking contact shoes 22, 24 in the example under consideration both lie along the same cylindrical surface of revolution centered on the Y axis and defined by the main circle of the teeth forming the locking contact shoes 22, 24.

The radius of the cylindrical surface is advantageously slightly less, by for example around 1 to 5%, than the radius of the first and second locking bearing surfaces 21, 23 (this radius is also defined as the radius of the main circle of the teeth of the locking bearing surfaces 21, 23 in the example under consideration) This means that each slug 14 can find its best position, by a slight rotation in a plane perpendicular to the Y axis, relative to the first and second locking bearing surfaces 21, 23. For example, this difference of radius may allow a slight rotation of from 0.3 to 1° by each slug 14 while leaving its first and second locking contact shoes 22, 24 in mesh with the first and second locking bearing surfaces 21, 23, respectively. If the locking bearing surfaces and the locking contact shoes are in toothed form, this feature means that, in particular, these teeth find the best possible mesh with each other, eliminating all angular play between the first and second connecting members, and ensuring that the first and second connecting members lock together extremely firmly. They lock particularly firmly because, when the hinge mechanism has to take an especially high torque, for example when the vehicle in which the seat is installed is involved in an accident, the slugs 14 work in shear to transmit the forces directly between the first and second locking bearing surfaces 21, 23.

The device described above works as follows.

Figure 8:
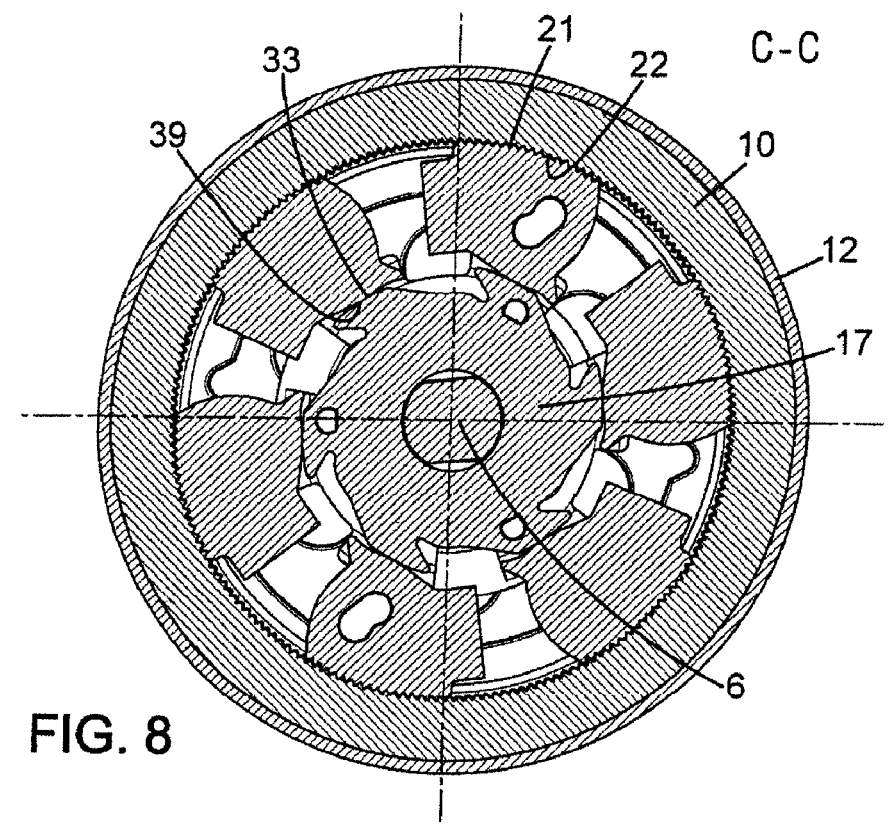
Figure 9:
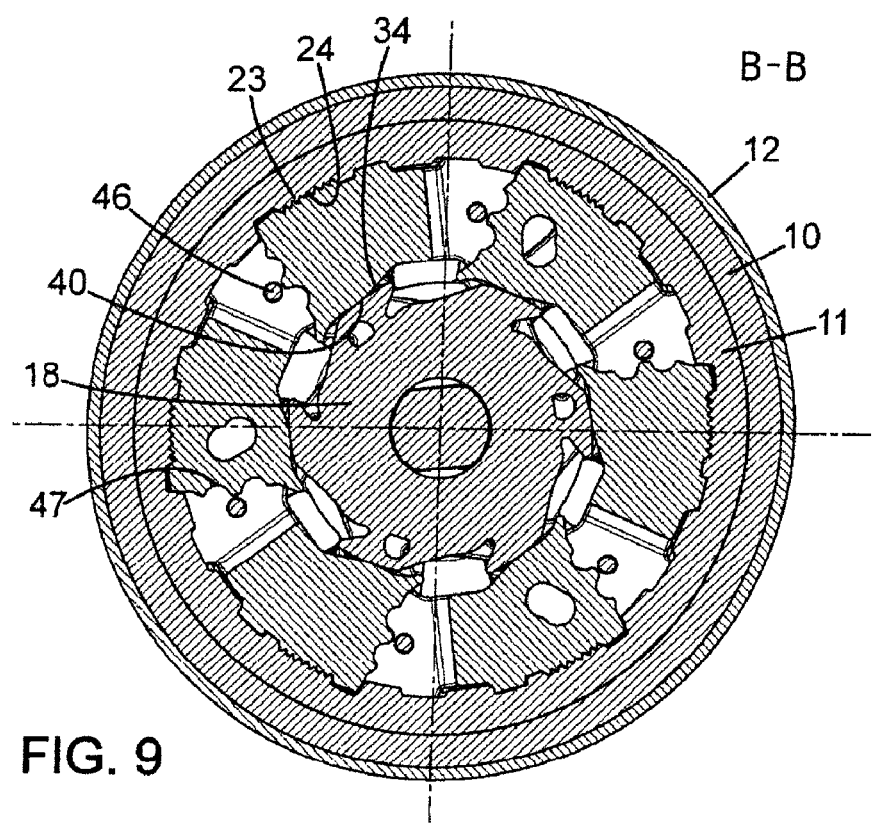

In the rest position of the hinge mechanism, as shown in FIGS. 8 and 9, the first and second locking contact shoes 22, 24 of each slug are in mesh with the first and second locking bearing surfaces 21, 23, respectively, belonging to the first and second connecting members 10, 11, respectively. The slugs are maintained in these positions by the contact between the cam surfaces 39, 40 of the first and second cams 17, 18, respectively, and the bearing surfaces 33, 34 of the slugs 14. The cams 17, 18 are maintained in their blocking position, FIGS. 8 and 9, by the elastic loading of the springs 19, 20. The six cam surfaces 39, 40 bear on the bearing surfaces 32, 34 of the six respective slugs. In this position the locking of the first connecting member 10 to the second 11 is exceptionally firm.

Figure 10:
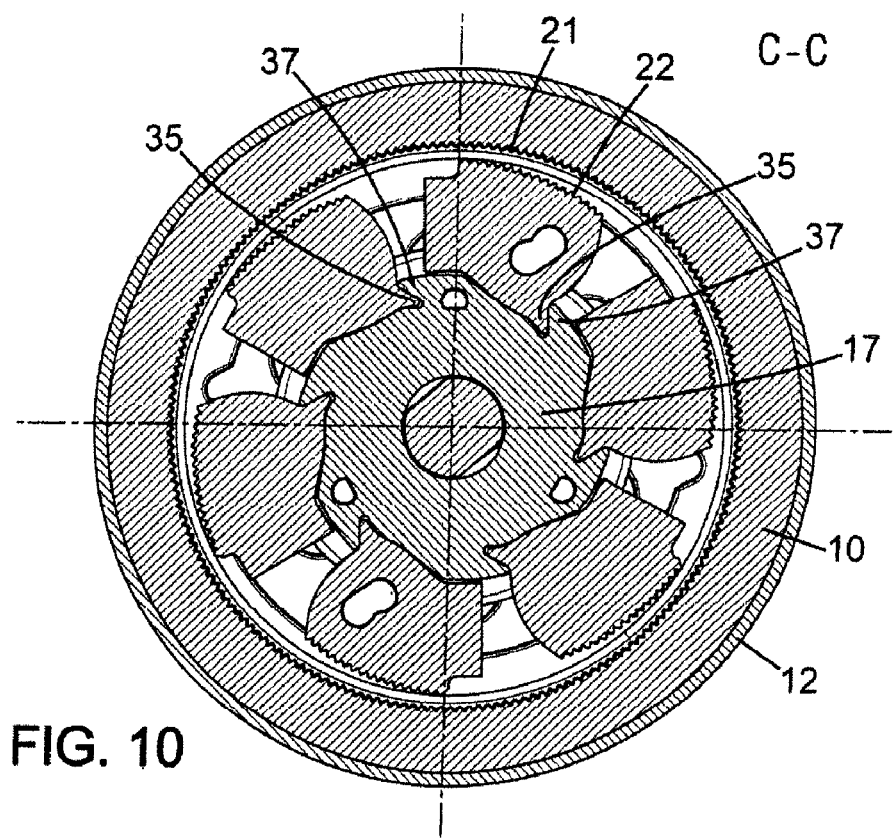
FIGS. 10 and 11 are views similar to FIGS. 8 and 9, respectively, showing the adjustment mechanism during an adjustment of the tilt of the backrest.
Figure 11:
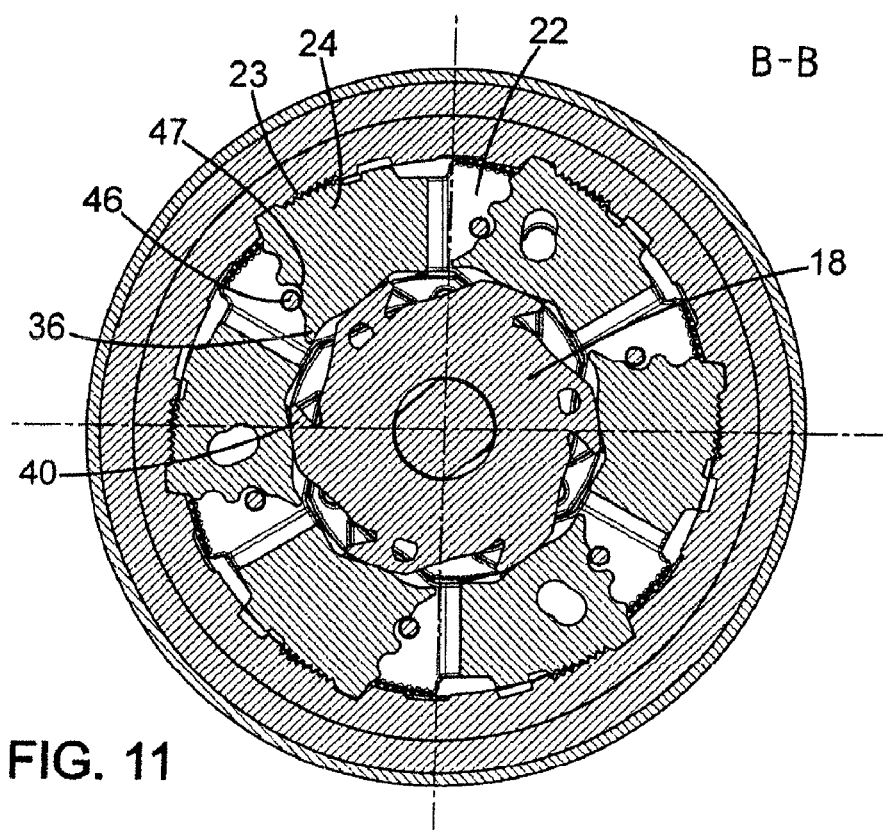

As FIGS. 10 and 11 show, when a user wishes to adjust the tilt of the backrest 4, he or she operates the handle 6 in the angular direction 6a so that the operating portions 43a push against the pins 17a of the first cam 17, moving said first cam 17 into the unblocking position in the angular direction 6a until the hooks 37 of said first cam engage on the release fingers 35 of the slugs 14 and cause these slugs 14 to pivot about their second locking contact shoe 24, which remains in mesh with the corresponding second locking bearing surface 23. The slugs 14 thus arrive in a first release position where their first locking contact shoe 22 does not interfere with the first locking bearing surface 21.

The pins 17a and 18a of the first and second cams are offset angularly in such a way that the actuating portions 44a do not interfere with the second cam 18 during this movement, so that the cam surfaces 40 remain in contact with the bearing surfaces 34 of the slugs 14, so ensuring that the second locking contact shoes 24 stay in mesh with the second locking bearing surfaces 23.

The pivoting movement of the slugs 14 is eased by the fact that the first and second locking contact shoes 22, 24 have a radius approximately equal to the radius of the first and second locking bearing surfaces 21, 23 or equal to said radius of the bearing surfaces 21, 23. The radius of the bearing surfaces 22, 24 may advantageously be slightly less than the radius of the bearing surfaces 21, 23. The abovementioned movement is also eased by the shaping of the angular extremities of the contact shoes, which are designed to avoid any interference between the slugs 14 and the connecting members 10, 11 when the slugs 14 pivot about one or other of these extremities. Movement of the contact shoes is radially guided by the guide pins 46 sliding in the radially most central curved part of the associated guide surface 47. It is also guided by the support of the main face 29b of the contact shoes which rests on the adjacent face 30a of the neighboring contact shoe.

When the hinge mechanism is in the position shown in FIGS. 10 and 11, that is, with its first cam 17 in the unblocking position and its second cam 18 in the blocking position, the seat backrest 4 can be tilted manually by the user, generally by pushing against a spring load which attempts to pivot the backrest 4 forwards.

If desired, it is possible to make sure that the cam 17 is in an unblocking position when the cheek plate 10 is not in a predefined angular position relative to the cheek plate 11. For this purpose, the inside face of the cheek plate 10 may for example be given a circular guide surface 50 in the shape of an arc of a circle (FIG. 4) that extends angularly either side of a larger-diameter zone 51. One of the slugs 14 has an axially projecting pin 52 (FIG. 7), which is in the zone 51 when the cheek plate 10 is in the angular range in which the cam 17 is allowed to move into the blocking position and in which the slugs 14 are allowed to lock against the teeth 21 of the cheek plate 10.

On the other hand, when the pin 52 is facing the guide surface 50, the latter prevents the first locking contact shoes 22 from locking against the teeth 21 and the cam 17 is thus maintained in the normal unblocking position.

If a user wishes to have access to the space behind the seat 1, he or she can recline the backrest 4 fully forwards by operating the handle 7 shown in FIG. 1, thus causing the lever 9 and the shaft 16 to pivot in the angular direction 9a.

In the course of this movement the actuating portions 43a of the first plate 43 do not interfere with the first cam 17, because of the angular offset between the pins 17a, 18a, so that the first cam 17 stays in its blocking position and keeps the first locking contact shoes 22 in mesh with the first locking bearing surface 21.

On the other hand, the hooks 38 of the second cam engage on the release fingers 36 of the slugs 14, pivoting the slugs 14 about their first locking contact shoe 22. Said slugs 14 thus move to the second release position, in which the second locking contact shoes 24 no longer interfere with the second locking bearing surfaces 23. The movement of the contact shoes is guided by the radially outermost curved part of the guide surface 47 sliding on the pin 46.

Additionally, in the course of this movement, the pins 28 of the slugs move out of the notches 26 of the second connecting member 11 and, as soon as the backrest begins to tilt forwards, these pins 28 bear against the guide surfaces 25, preventing the second locking contact shoes 24 of the slugs from reengaging with the first locking bearing surfaces. In the course of the forward pivoting movement of the backrest, the pins 28 stay in contact with the guide surfaces 25 while the whole control device 15 moves with the slugs 14 and the first connecting member 10 as they rotate about the Y axis, with the backrest 4.

When the user wishes to raise the seat backrest 4 after having folded it forwards, this movement produces an angular movement of the slugs 14 in the opposite angular direction to the direction 9a, until the pins 28 abut on the stops 27 which define the latching position of the slugs 14 relative to the second connecting member 11. The pins 28 then engage in the notches 26, which allows the second locking contact shoes 24 of the slugs 14 to mesh again with the second locking bearing surfaces 23.

Notice that when the pins 28 abut on the stops 27, the slugs 14 push against the first locking bearing surface 21, so that there is no risk of the first locking contact shoe 22 of each slug coming unlatched.

This ensures that the seat backrest 4 locks back in exactly the same angular position as it occupied before the handle 7 was operated.

When relocking is completed, the slugs position themselves automatically because of the small clearance allowed between the slugs 14 and their cams and respective locking bearing surfaces. This small clearance corresponds to a slight rotation, of at least 0.3°, of the slugs in a plane perpendicular to the axis of rotation Y. The result is optimal locking of the locking contact shoes 22, 24 with the corresponding locking bearing surfaces 21, 23.

Figure 13:
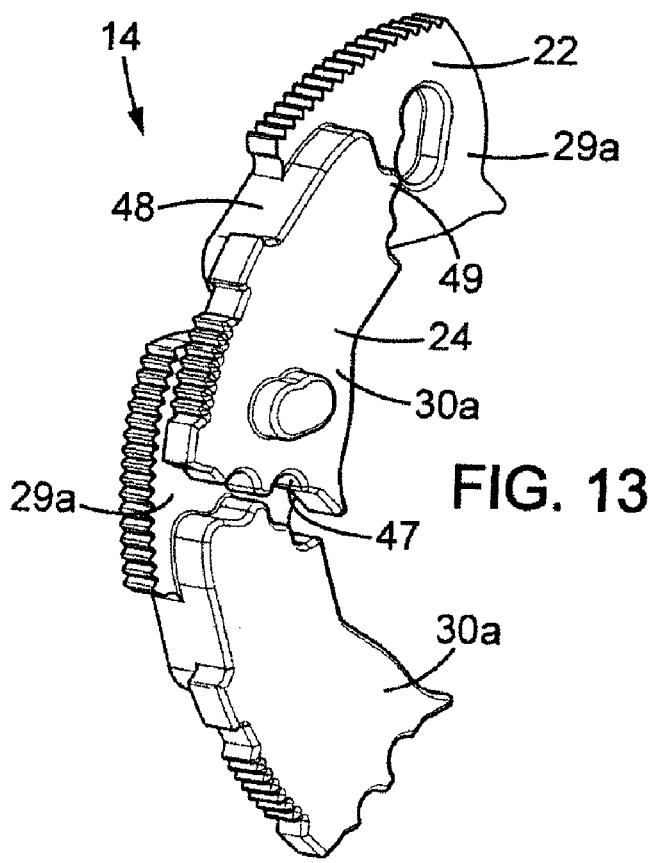
FIG. 13 is a perspective view of two adjacent slugs in accordance with a second embodiment.

In a second embodiment, the slugs 14 are modified to have no bend 31. The slugs as shown in FIG. 13 may be made for example by forging, the second contact shoe 24 having a thickness $T_{24}$, the first contact shoe 22 a thickness $T_{22}$, and a central portion 48 connecting these two contact shoes and having a thickness $T_{48}$ equal to or greater than the sum of the thicknesses of the first and second shoes, for example equal to this sum. The guide pin 46 of the first embodiment is thus here replaced by a guide protrusion 49 which continues on from the second contact shoe 24. The guide protrusion 49 engages with the guide surface 47 of an adjacent slug when one of the slugs moves between its locked position and one of its release positions, to guide this movement. The rest of the mechanism is unchanged in this second embodiment.

The invention claimed is:

1. A motor vehicle seat tilt adjustment mechanism comprising:
    a first cheek plate designed to be fixed to a first seat element,
    a second cheek plate designed to be fixed to a second seat element and rotatably mounted relative to the first cheek plate about a tilt axis, and
    a locking system comprising:
    a first locking bearing surface on the first cheek plate,
    a second locking bearing surface on the second cheek plate, in a plane parallel to the first bearing surface, and at least a first slug and a second slug, each having a first contact shoe adapted to engage with the first bearing surface, and a second contact shoe adapted to engage with the second bearing surface, the slugs being moveable from a locking position in which they engage with the two bearing surfaces to prevent a relative rotation of said cheek plates, to at least one release position in which they no longer engage with at least one of the two bearing surfaces in order to allow a relative rotation of said cheek plates, wherein the first contact shoes of at least the first and second slugs extend circumferentially about the tilt axis, each having a first radial guide surface and a second radial guide surface, both parallel to the tilt axis, the first and second guide surfaces being complementary, and the first guide surface of the first slug being adapted to engage with the second guide surface of the second slug throughout the entire movement of the first slug between its locking and release positions.

2. The adjustment mechanism according to claim 1, in which the first slug has a rotational movement between its locking and release positions, and in which the first guide surface comprises a curved sector, and the second guide surface comprises a protrusion which slides in the curved sector during said movement of the first slug.

3. The adjustment mechanism according to claim 1, in which the first guide surface of the first slug is adapted to engage with the second guide surface of the second slug also during the movement of the second slug between its locking position and its at least one release position.

4. The adjustment mechanism according to claim 1, in which each slug has a bent intermediate region between the first and second contact shoes.

5. The adjustment mechanism according to claim 1, in which the first contact shoe is formed by a thin plate of a first thickness; in which the second contact shoe is formed by a thin plate of a second thickness; and in which the slug has a thick intermediate region between the first and second shoes, the thickness of which is equal to or greater than the sum of the first and second thicknesses.

6. The adjustment mechanism according to claim 1, comprising a first operating member designed to be moved by a user to move the slugs into a first release position, the first operating member comprising a first stop surface, the first contact shoe of the first slug being formed by a thin plate having approximately parallel first and second main walls, the edge of the thin plate comprising one of the first and second guide surfaces of the first slug, and first and second blocking surfaces radially spaced apart from each other, the first stop surface of the first operating member contacting the first blocking surface, the second blocking surface engaging with the first locking bearing surface, and the first main wall resting on a main wall of a contact shoe of another slug in the locking position of said first slug.

7. The adjustment mechanism according to claim 1, in which the first bearing surface occupies 360°; and in which the second bearing surface comprises a plurality of separate locking sectors angularly spaced apart from each other.

8. The adjustment mechanism according to claim 1, comprising a first operating member operable by a user to move the slugs from their locking position to a first release position, in which position the first bearing surface is free to rotate relative to a system consisting of the second cheek plate and the slugs about the tilt axis, and comprising a second operating member operable by a user independently of the first operating member, to move the slugs from their locking position to a second release position, in which position the second bearing surface is free to rotate relative to a system consisting of the first cheek plate and the slugs about the tilt axis.

* * * * *